Oct. 9, 1962 I. BALAN 3,058,020

LIGHT DIMMER STRUCTURE

Filed Feb. 23, 1961 2 Sheets-Sheet 1

INVENTOR.
ISADORE BALAN.
BY Allen M Krass
ATTORNEY

INVENTOR.
ISADORE BALAN
BY Allen M Krass
ATTORNEY 3,058,020
LIGHT DIMMER STRUCTURE
Isadore Balan, 18249 Robson, Detroit, Mich.
Filed Feb. 23, 1961, Ser. No. 90,979
6 Claims. (Cl. 313—46)

This invention relates to power control devices such as an electronic dimmer for lights and, more particularly, to a mechanical structure and housing for such a dimmer.

My United States patent application, Serial No. 66,471, filed November 1, 1960, for a "Dimmer for Electric Lights" describes electronic circuitry for controlling the portion of an alternating current cycle applied to a load and thereby the effective power applied to the load. Broadly, the circuitry comprises a bridge of silicon rectifiers which has its midpoints shorted by the anode-cathode circuit of a semiconductor controlled rectifier. A firing circuit for the rectifier controls the point in each alternating current half-cycle at which it becomes conductive. When it is conductive, it passes current to a load placed in series with the end points of the bridge through one of the two rectifier pairs in the bridge. The firing circuit is adjusted by a potentiometer. In this manner the circuit controls the application of full-wave power to the load which is preferably an incandescent lamp and thus controls the intensity of the lamp.

A device which operates in a broadly similar manner is disclosed in my patent application, Serial No. 47,463, filed August 4, 1960, for an "Electronic Light Dimmer." This circuit performs a similar function but operates in a different electronic manner and employs a single semiconductor controlled rectifier and one power rectifier.

Both of the above devices as well as other possible circuits employing silicon controlled rectifiers may be used to replace conventional on-off wall switches which control the incandescent lights. In order to simplify the process of replacing an existing on-off switch with an electronic dimmer, it is desirable that the dimmer have such a physical configuration as will enable it to fit within the same type of wall enclosure that is commonly used for an on-off switch. The smallest of these wall enclosures in common use is approximately 3″ x 2″ x 2″ deep. These dimensions dictate the maximum configuration of the dimmer box.

In order for the electronic dimmer to operate properly, means must be provided for transferring heat from the unit to its environment. All of the dimmers employ from one to four semiconductor rectifiers and one or two semiconductor controller rectifiers. These units have a low resistance when conductive in a forward direction, however, each dissipates up to as much as three watts when operating into approximately a 300-watt load, which is a reasonable watt value for a dimmer for residential incandescent lights. Therefore, as much as 15 watts of heat must be transferred out of the unit while it is operating at 300-watt range and even greater amounts of heat must be transferred at higher powers. This heat transfer must be accomplished without an excessive temperature buildup in the unit for at least two reasons. First, the existence of a high-temperature source within a residential wall is inherently unsafe and, secondly, the semiconductor devices will only operate properly within a relatively narrow temperature range. Therefore, the means for transferring heat from the dimmer to its environment must not only handle a relatively high amount of heat power but must be of such efficiency as to prevent an excessive temperature buildup in the unit.

The heat dissipating structure must be so formed as to avoid exposing to operator touch any conductive surfaces which are electrically alive such as the rectifier casings.

These and other objects are achieved in the present invention through the use of a heat transfer plate affixed to an insulated housing which contains the electronic components of the dimmer disposed within the wall enclosure. The metallic plate is disposed parallel to the wall and immediately adjacent to it and has such a surface construction as to provide maximum heat transfer as well as to generate vertical convection air currents. This plate has the high heat generating components of the circuit such as the rectifiers and the controlled rectifier studded directly to it. The metallic plate is covered by a decorative plastic plate designed to provide adequate ventilation to the metallic plate.

It is therefore seen to be an object of the present invention to provide a physical configuration for an electronic light dimmer which will allow it to be placed within the wall enclosure normally utilized for on-off switches without excessively heating the enclosure.

Other objects, advantages and applications of the present invention will be made apparent by the following, detailed description of two embodiments of the invention.

The description makes reference to the accompanying drawings in which.

Figure 1:
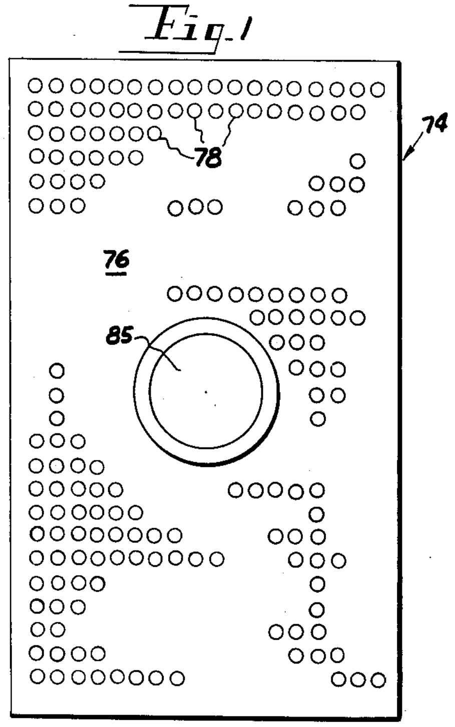
FIGURE 1 represents a front view of a dimmer which is the preferred embodiment of the present invention.
Figure 2:
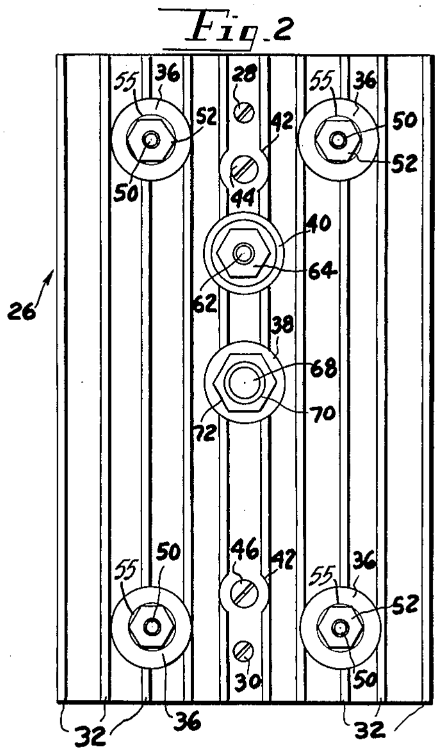
FIGURE 2 represents a front view of the dimmer with a decorative cover plate and control knob removed.
Figures 3, 4:
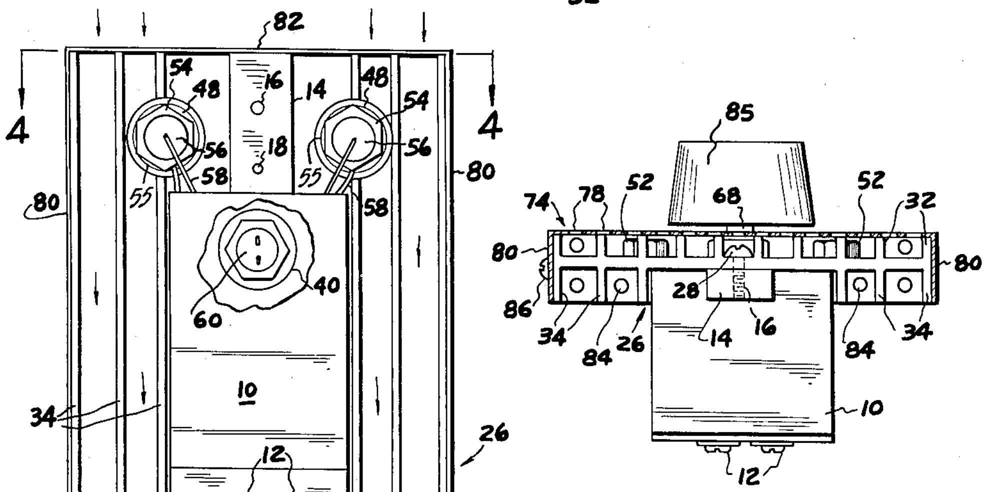
FIGURE 3 represents a back view of the preferred embodiment of the dimmer.
FIGURE 4 represents a cross sectional view of the preferred embodiment of the dimmer taken along lines 4—4 of FIGURE 3.

The preferred embodiment of the first five figures of the drawings employs a generally rectangular plastic housing 10 to retain most of the electronic components which comprise the circuitry of the dimmer and examples of which are disclosed in the previously referred to patent applications. The housing 10 is preferably formed of urea or other thermo-setting plastics. Near the lower end of its back side, it has a pair of screw terminals 12 which comprise its sole means of electrical connection to the balance of the lighting system.

A plastic arm 14 is affixed to the forward edge of the upper side of the housing 10 and projects upward vertically therefrom. The arm 14 is rectangular in shape and has a pair of threaded holes 16 and 18 passing from its front face to its rear face along its centerline. An identical arm 20 having a pair of holes 22 and 24 is affixed to the housing 10 at the forward edge of its lower side and projects downwardly therefrom.

The two arms are used to connect the housing 10 to a heat transfer plate, generally indicated at 26, by means of two screws 28 and 30 which pass through holes in front of the heat transfer plate into the threaded holes 16 and 22 of the upper and lower arms 14 and 20, respectively. The heat transfer plate 26 abuts the front surface of the housing 10 which is otherwise open.

The heat transfer plate is generally rectangular in shape and is characterized by a plurality of vertical fins 32 on its front surface and a similar plurality of fins 34 at its rear surface. The plate 26 is preferably formed of extruded aluminum.

The front vertical fins 32 are uniform and continuous with the exception of six flat spots at which the fins are milled away to slightly below the level of the main section of the plate. Four of these flats 36 are in the proximity of the corners of the plate while one of the other flats 38 is exactly in the center of the plate and the sixth flat 40 is disposed directly above the flat 38. The center pair of fins is also milled away, directly below and above the screw holes 28 and 30, respectively, as at 42, to accommodate the heads of screws 44 and 46 which pass through the heat transfer plate 26 and the holes 18 and 24 in the arms 14 and 20 and are used to attach the entire assembly to a wall enclosure.

The rear vertical cooling fins 34 are arranged in two groups of three each in either side of the plate 26. The two extreme fins on each side are continuous and the two center fins are each interrupted at two points by flats 48 which match the flats 36 in the front of the plate. The two inner fins 34 are spaced by a sufficient distance to allow the housing 10 to be disposed between them in intimate contact with the central portion of the plate 26.

In the embodiment disclosed, four semiconductor rectifiers of the stud mounted type are utilized in accordance with the circuitry of the earlier above noted patent applications. The rectifiers are mounted directly on the heat transfer plate 26 at the flats 36 and 48. A central hole passes through the plate at each of the flats and the studs 50 of silicon rectifiers are passed through these holes.

The studs are fastened by nuts 52 on their front sides which bear against the hex head portion of the rectifiers 54 which are disposed on the back side of the plate. Extremely thin mica washers 55 are inserted between the hex heads 54 and the plate and the nuts 52 and the plate and the central hole is of a sufficient diameter to insure that the studs 50 do not contact it. This insulates the rectifiers electrically from the plate but the thin mica washers 55 allow appreciable heat transfer from the stud to the plate. The rectifiers themselves 56 are connected to their associated circuitry within the housing 10 by means of leads 58. A silicon controlled rectifier which is the central device in the electronic circuitry has a similar stud mount configuration 60. It is mounted with respect to the flat 40 by means of its stud 62 and a nut 64. It is also electrically insulated from the heat transfer plate by means of mica washers between its hex surface, nut 64, and the plate surfaces. The portion of the controlled rectifier 60 behind the plate extends within the housing 10 and makes connection with the balance of the circuitry by means of leads 66.

A potentiometer 67, which is used to control the current passing through the dimmer in accordance with the disclosures in the referred to patent applications, is disposed within the housing 10 and its shaft 68 extends from the front of the housing 10 through a central aperture in the heat transfer plate 26. A threaded boss 70 encircles the shaft near its base and also projects through the central hole in the plate. This threaded boss is used to affix the potentiometer within the plate by means of a nut 72 disposed in the outer surface of the plate and the area of the flat 38. The heat transfer plate 26 is covered by a plastic plate, generally indicated at 74. The plate 74 comprises a front plate 76 which is covered by a continuous pattern of holes 78. Two unperforated side plates 80 extend backward along the line of the side fins. Top and bottom plates 82 which contain perforations 84 complete the cover assembly. The cover has a central aperture which allows the shaft 68 of the potentiometer to pass through. A knob 85 is affixed to the end of the shaft. The cover plate 74 is affixed to the heat transfer plate 26 by means of a screw 86 which is affixed to one of the side plates 80 of the cover 74 and affixes and enters a threaded hole in a plate 26.

Figure 5:
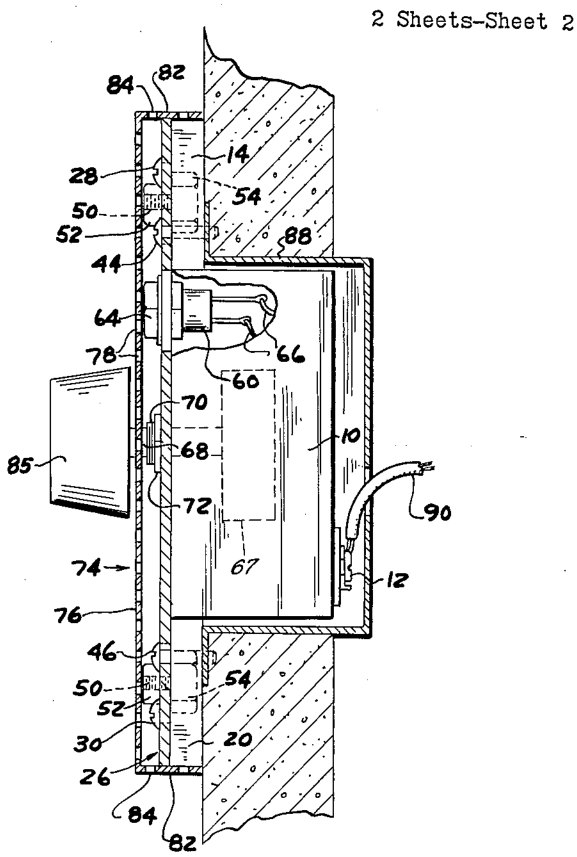
FIGURE 5 represents a vertical cross-section through a preferred embodiment of the dimmer as disposed within a normal wall and wall enclosure.

FIGURE 5 of the dimmer assembly is illustrated and disposed within an enclosure box 88 affixed within a wall. The screws 44 and 46 are shown to pass through the cover plate and the arms 14 and 20, respectively, into threaded holes in the box. The two-wire cable 90 is illustrated connected to the terminals 12.

Figure 6:
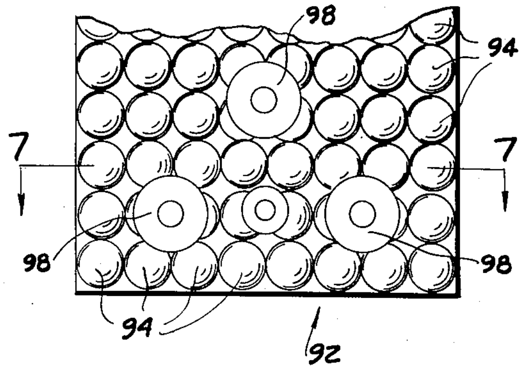
FIGURE 6 represents a partial front view of an alternate embodiment of a heat transfer plate for such a dimmer.
Figure 7:
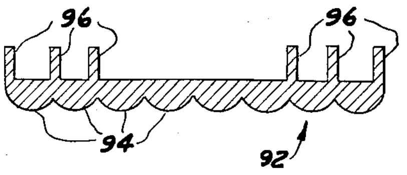
FIGURE 7 represents a cross-section through the embodiment of FIGURE 6 taken along lines 7—7 of FIGURE 6.

An alternative embodiment of the heat transfer plate 26 is illustrated in FIGURES 6 and 7. The plate, generally indicated at 92, has a plurality of semispherical surfaces 94 on its front instead of the fins 32. These semispherical surfaces perform the functions of providing a maximum surface area for heat transfer and for breaking up any possible laminar flow of vertical convection currents by their irregularity. Otherwise the plate is the same as the other embodiment 26 having a plurality of flats 98, which are the equivalent of the flats 36, 38 and 40, and having rear fins 96, which are the equivalent of the rear fins 34.

In operation, the major portions of heat developed by the dimmer unit is conducted from the rectifiers 54 and the controlled rectifier 60 to the surface of the plate 26, or 92 in the alternative embodiment. The holes 84 in the top of the plastic cover plate 74 allow ventilation through the top and the bottom of the device and thereby vertical convection currents are created which ventilate the device. The holes 78 in the cover plate add to the ventilation of the heat transfer plate.

Having thus described my invention, I claim:

1. A housing for an electronic power control circuit employing a semiconductor controlled rectifier, at least one semiconductor rectifier and a potentiometer, including: a plastic housing having a pair of electrical terminals thereon and being enclosed on all sides except one; a metallic plate abutting said housing on said non-enclosed side in such a manner as to substantially enclose said housing and having an extension beyond said housing at all points of their intersection; means for physically connecting said semiconductor controlled rectifier to said plate in such a manner that its major portion extends into said housing, said connection being an electrically insulated one; means for physically but not electrically connecting said semiconductor rectifier to said plate at a point beyond its extension from said housing; heat dissipating projections on both faces of said plate; and a protective cover for said plate adapted to engage it on all sides except that of the surface which is in contact with said housing and having ventilation means adapted to allow air currents to pass in a direction parallel to the plane of said plate.

2. A housing for a power control unit employing a semiconductor controlled rectifier, four semiconductor rectifiers, and a potentiometer, including: a plastic housing for said control components having a pair of electrical terminals and being enclosed on all faces except one; a heat conductive plate abutting said housing at said open face in such a manner as to enclose said housing and extending beyond said housing at all points of their intersection; means for physically mounting said control rectifier on said plate in an electrically insulated manner therefrom so that a major portion of said controlled rectifier projects within said housing, means for mounting said four rectifiers at spacially separated points about said plate outside of the area bounded by the intersection of said housing in an electrically insulated manner therefrom; said plate having a hole in the area bounded by its line of contact with said housing; a potentiometer mounted in said hole with its housing extending within said housing; a plurality of heat dissipating projections on both faces of said plate except in the area bounded by its line of contact with said housing; and a protective cover for said plate disposed parallel and contiguous thereto and having a plurality of apertures therein to allow ventilation of said plate and in a direction parallel to the plane of its extension.

3. A housing for a power control unit which includes a semiconductor controlled rectifier, at least one semiconductor rectifier, and a potentiometer, including: an electrically non-conductive housing for said components having an open edge lying substantially in a single plane; a pair of electrical terminals disposed on said housing; a heat transfer plate abutting the free surface of said housing so as to substantially enclose the space within said housing, and extending beyond its line of contact with said housing in all directions; a plurality of elongated fins on both sides of said plate; means for mechanically supporting said controlled rectifier on said plate within the area encompassed by the plate's line of contact with said housing, with a major portion of said controlled rectifier extending into the volume bounded by said housing and said plate; means for supporting said semiconductor rectifier on said plate externally of the area bounded by the plate's line of contact with said housing; electrical connections between said semiconductor rectifier and circuitry within said housing; a non-conductive cover for said plate disposed parallel to and in contact with the side of said plate opposite from that contacted by said housing; and said cover having a plurality of apertures for the purpose of allowing air to circulate to said plate.

4. A housing for a power control unit of the type employing at least one semiconductor controlled rectifier and at least one semiconductor rectifier, including: a housing formed of an electrically non-conductive material having its free edge substantially in a single plane; a pair of electrical terminals on said housing; a heat transfer plate having a portion of its area in contact with the free edge of said housing so as to enclose the volume within said housing; a plurality of heat dissipating fins disposed on both sides of said plate and projecting in a direction perpendicular to the plane of extension of said plate; a semiconductor controlled rectifier supported on said plate within the area bounded by the plate's line of contact with the said housing and having its major portion extending into the volume limited by said housing and said plate, the projection of said controlled rectifier from the plane of the plate and in a direction away from the housing being no greater than the extension of said heat conducting fins on that side; means for supporting said semiconductor rectifier on said plate on a portion external of the area of the plate bounded by its line of contact with said housing, the extension of said semiconductor rectifier along a line transverse from the plane of the plate not exceeding the degree of extension of said heat conducting fins in the corresponding direction; and a potentiometer supported on said plate with its housing extending within the volume bounded by said housing and said plate, and with its shaft extending perpendicularly from the plate in a direction away from said housing.

5. A housing for a power control unit of the electronic type which includes at least one semiconductor controlled rectifier and at least one semiconductor rectifier, including: an electrically non-conductive housing open on a single side; a pair of electrical terminals on the external side of said housing; a flat heat transfer plate affixed to said contact so that the plate substantially closes the free side of said housing; heat dissipating members integral with said housing and extending from it in a direction transverse to its plane of extension; means for supporting said semiconductor controlled rectifier on said plate within the area defined by the plate's line of contact with said housing in such a manner that the major portion of said controlled rectifier extends into the area bounded by said housing and said plate and the controlled rectifier extends from said plate in a direction away from said housing by a distance not exceeding the extension of said heat dissipating projections in that direction; means for supporting said semiconductor rectifier on said plate on a point outside of the area bounded by the line of contact between said plate and said housing, the extensions of said semiconductor rectifier in both directions transverse to the plane of said plate not exceeding the extensions of said heat dissipating projections in those directions; a potentiometer forming a part of the electronic circuitry of said power control unit and supported in a central aperture in said plate with its major portion extending into the volume bounded by said housing and said plate with its shaft extending perpendicularly from said plate in a direction away from said housing; and an electrically non-conductive cover generally rectangular in shape disposed parallel to and contiguous to the side of the plate opposite to that which said housing contacts, said plate having extensions on its two long sides in a direction perpendicular to its plane of extension and toward the opposite side of the plate to that which it contacts and having a plurality of apertures on its side which contacts said plate.

6. A housing for an electronic power control circuit employing a semiconductor controlled rectifier, at least one semiconductor rectifier and a manually variable electric element, including: an insulated housing having a pair of electrical terminals thereon and being enclosed on all sides except one; a metallic plate abutting said housing on said nonenclosed side in such a manner as to substantially enclose said housing and having an extension beyond said housing at all points of their intersection; means for physically connecting said semiconductor controlled rectifier to said plate in such a manner that its major portion extends into said housing, said connection being an electrically insulated one; means for physically but not electrically connecting said semiconductor rectifier to said plate; and heat dissipating projections on said plate.

References Cited in the file of this patent

UNITED STATES PATENTS

| | | |
|---|---|---|
| 2,002,491 | Despard | May 28, 1935 |
| 2,193,740 | Reed | Mar. 12, 1940 |
| 2,896,125 | Morton | July 21, 1959 |